April 24, 1962 LE ROY GALLANT 3,030,660
FILM EXTRUSION NOZZLE
Filed Nov. 21, 1957
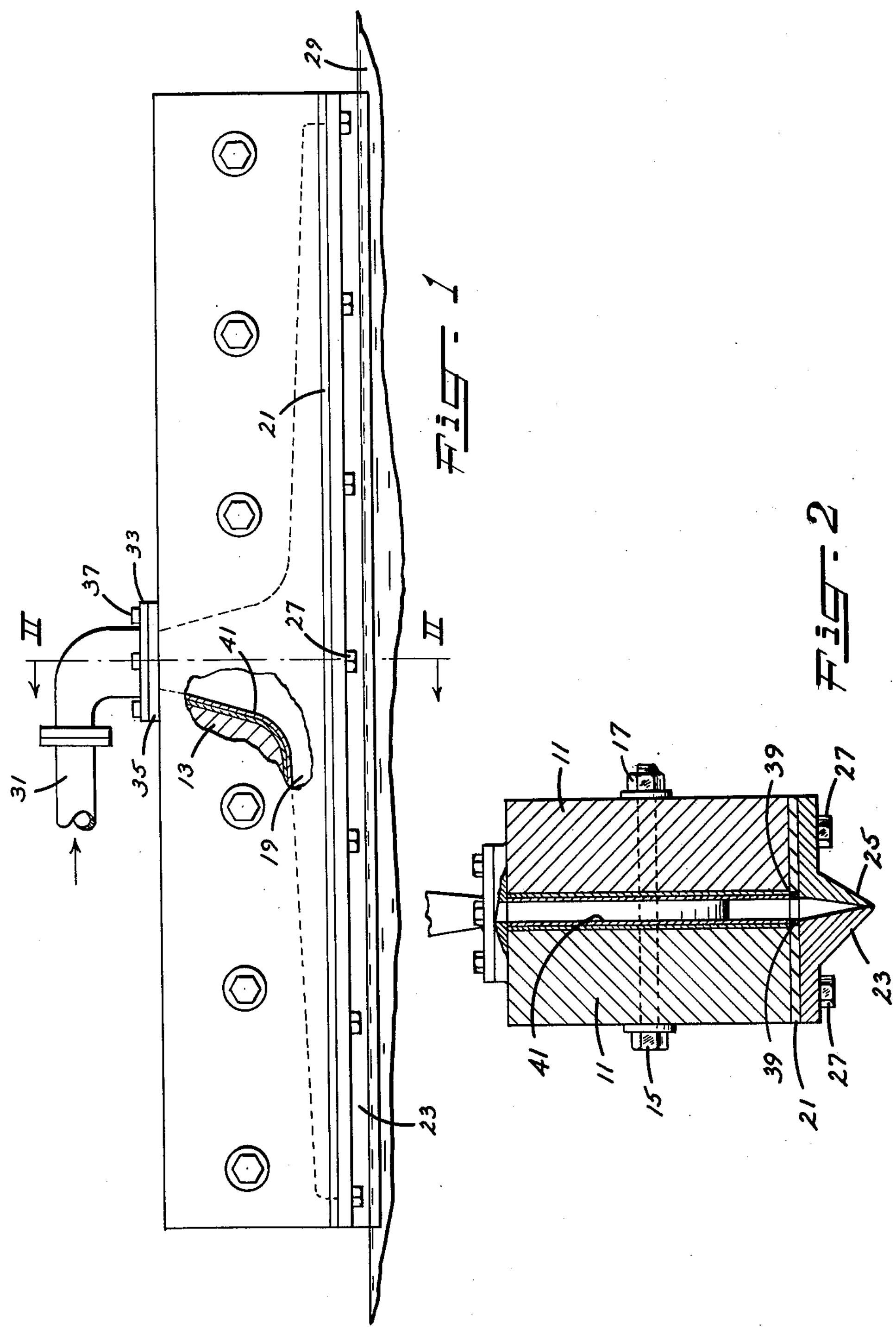

United States Patent Office 3,030,660

Patented Apr. 24, 1962

3,030,660

FILM EXTRUSION NOZZLE

Le Roy Gallant, Fredericksburg, Va., assignor to American Viscose Corporation, Philadelphia, Pa., a corporation of Delaware Filed Nov. 21, 1957, Ser. No. 697,985

5 Claims. (Cl. 18—12)

The invention relates to the manufacture of cellulosic sheets, films, tubing and the like, and more particularly, to an improved extrusion apparatus for the production of cellophane film.

In the manufacture of regenerated cellulose films, for example, viscose is forced through a nozzle having an elongated orifice, beneath the surface of a coagulating bath. From this bath, the thin and continuous partially formed film is passed through several subsequent treatments including additional coagulating and regeneration, purification, finishing, and drying. The finished cellulose film, as is generally understood, is thin and non-porous and presents a glass-clear appearance.

The extrusion nozzles presently employed include, primarily, a main cast iron body and a pair of substantially parallel metal blades or lips, with a bottom or bearing plate interposed between the main body and the blades. The blades are slidably adjustable relative to the bearing plate to provide the desired extrusion orifice, and must be perfectly smooth and free from irregularities so as to eliminate any tendency for streaks or blemishes to be formed in the finished film. As noted above, the orifice forming blades are submerged below the surface of the coagulating bath and are therefore formed of nickel to avoid corrosion, while the bearing plate, for the sake of economy and corrosion resistance, is made of Monel, which is primarily a copper-nickel alloy.

Notwithstanding the extreme care employed in the manufacture of the nozzle parts and in practicing the extrusion process itself, the finished cellophane film much too often contains tiny imperfections which results in considerable film rejection and waste. One of the most troublesome film imperfections has been the occurrence of chain bubbles which, under microscopic investigation, appear as minute voids on the order of .002 to .006 inch in diameter, arranged in either short or long chains and resembling a string of beads. For identification purposes, those skilled in the art have classified chain bubble-formations into roughly three types as follows:

(*a*) Short chains starting with a large void or hole in the sheet followed by voids of decreasing size and extending from six inches to a foot or two along the sheet.

(*b*) Longer but discontinuous chains of bubbles of about the same size which intermittently appear and disappear in the same location along the length of the running film.

(*c*) Chains of small bubbles appearing continuously in the same location for long periods of time, as for example for hours or days of continuous film production.

Upon making an exhaustive study of this problem, it has been discovered that chain bubbles, particularly of the types noted as (*b*) and (*c*), result from or at least coincide with the corrosion of the corner areas of the nozzle blades or lips. While chain bubbles of type (*a*) may at times be due to air in the extruded viscose, and chain bubbles of the type (*c*) may result from tiny fragments of dirt within the lip areas, extensive study has indicated that corrosion of the orifice forming blades appears to be the prime factor for the chain bubble formations.

During the film extrusion process, the sudden changes in velocity, pressure and temperature of the film forming material, taken with the chemical conditions mentioned above, create a highly corrosive condition just inside the lips which gradually etches away the last ten to twenty thousandths of an inch of the internal lip surfaces to a depth of two to five thousandths of an inch. These corroded areas are barely visible to the eye or sensitive to the touch but occur at random points along the orifice forming blades, and may vary from one or two to a large number at any particular time. It appears, that during this corrosive action, electrolytic cells occasionally occur which continuously liberate chains of gas bubbles for extended periods of time and which ultimately are revealed as imperfections in the finished film.

Up until the present invention, the remedies employed to eliminate or minimize the chain bubble action were directed primarily toward the effect rather than the cause of the corrosion itself. One of the more common of these known remedies has been to grind the internal surfaces of the blades. Freshly ground blades will provide films free from chain bubbles for extended periods, which may well extend to several months. However, blade grinding requires periodic removal of the extrusion device, thereby stopping the production of an expensive machine and necessitating considerable time and labor in both the blade grinding and replacement procedures. Further, since the chain bubbles may appear and disappear at different time intervals, their presence may not be noted until a substantial amount of defective sheeting is being produced, and thus this aspect also leads to uneconomical manufacture.

The prior art on this particular problem has not been very helpful and, at best, serves well to emphasize the need for an improved film extrusion apparatus and method as more fully described hereafter. One approach made by these prior disclosures has been to incorporate an additive into the viscose or spinning bath so as to prevent the roughening of the lips of the extrusion orifice. This procedure, however, is considered unsatisfactory and not too practical since a change in the composition of either the viscose or the spinning bath often necessitates changes in the spinning process or alters the characteristics of the film itself. Hence, this suggestion, in effect, eliminates one problem while creating others. A more direct approach taught by the prior patents has been to replace the nickel blades with an alloy similar to Hastelloy or Illium, which materials have a high resistance to corrosion. Unfortunately, alloy materials of this type are far more expensive than nickel and are not as readily available. Accordingly, a primary object of this invention is to provide a new or improved and more satisfactory extrusion apparatus for use in the production of continuous films.

Another object is to provide an improved extrusion apparatus for use in the manufacture of cellulose films which eliminate or minimize the corrosion of the conventional nickel orifice forming blades without any change in the composition of the spinning solution or the film treating bath.

Still another object of this invention is the provision of an apparatus for use in extruding regenerated cellulose films which are free from chain bubble formations.

A further object is the provision of means for rendering the nickel blades of a conventional cellophane extrusion nozzle resistant to corrosion without any change in the spinning conditions and without changing the physical structure of the blades, as for example by periodic grinding.

These and other objects, features, and advantages will become apparent from the following description of the invention and the drawing relating thereto in which:

FIGURE 1 is a front view of a nozzle formed in accordance with the present invention, with a portion thereof being broken away to more clearly illustrate the interior arrangement; and FIGURE 2 is a transverse vertical section taken substantially along the line II—II of FIGURE 1.

Briefly, the above objects are achieved by plating or cladding certain critical areas of the extrusion device so as to eliminate any tendency for electrochemical corrosion to take place between the orifice forming blades and the adjacent parts of the extrusion nozzle. As is generally understood, electrochemical corrosion involves the flow of electric current from one metallic surface (the anode) through an electrolyte to another metallic surface (the cathode). To give rise to this condition, there must be a complete electrical circuit, an electrolyte, and a difference in potential between the two metal surfaces. With these conditions being satisfied, the metal comprising the anode will normally go into solution. The electrical driving force in this galvanic circuit is the difference in potential between the anode and cathode and can be produced in a variety of ways, as for example, by contact between dissimilar metals, and concentration cells.

Applying these factors to the present case, it will be noted that an electrochemical circuit may well be set up between the interior surface of the Monel bearing plate of the nozzle and the interior surfaces of the adjoining orifice forming nickel blades, with the viscose serving as the electrolyte. In reviewing the galvanic series of metals, it will be noted that Monel is listed below nickel (active) and above nickel (passive) and thus it is reasonably accurate to assume that the nickel blades of the conventional extrusion device function as the anode while the contacting Monel bearing plate serves as the cathode of the galvanic circuit. Once the viscose is passed through the extrusion nozzle, all conditions for electrochemical corrosion are satisfied, and thus a gradual etching of the nickel blades of the nozzle takes place. To prevent the occurrence of this galvanic circuit and the resulting formation of chain bubbles, the film-forming material, in accordance with the present invention, is extruded through a nozzle in which the bearing or bottom plate is made entirely of nickel, or alternatively and preferably of Monel metal having its interior edge surfaces first treated with an etching solution and then plated with a nickel composition.

Referring to the drawings for a more detailed description, the nozzle of the present invention includes a pair of main castings 11, between which are disposed a pair of wing-shaped spacers 13. As with the conventional nozzle structures, both the main castings 11 and the spacers 13 may be formed of cast iron. Cooperating bolts 15 and nuts 17 unite the castings 11 and spacers 13 into an integral structure as shown in FIGURE 1, with the spacers providing the nozzle with a fan-shaped discharge channel 19. Carried at the lower ends of the main castings 11 is a bottom or bearing plate 21 and a pair of extrusion blades or orifice forming lips 23 and 25, the latter of which are adjustable relative to the bearing plate 21 and locked in place by bolts 27.

As heretofore mentioned, the orifice forming blades 23 and 25 of the extrusion nozzle are submerged, during spinning, just below the surface of the coagulating bath, indicated generally at 29, and are preferably formed of nickel so as to resist the corrosive characteristic of the acidic coagulating bath. For the sake of economy and resistance to corrosion, the bearing plate 21 is made of a Monel metal. From FIGURE 2, it will be noted that the backing plate 21 and the orifice forming blades 23 and 25 are in direct contact with each other and that a difference in potential can very well develop between these two parts. The viscose is admitted into the nozzles through a feed line 31 which is attached to the top of the nozzle assembly by means of flanges 33 and 35 and bolts 37. This film-forming solution, which apparently acts as the electrolyte in a conventional spinning process, passes down through the cavity of the nozzle and is distributed substantially across the full length of the blades 23 and 25 by the fan-like spacers 13. It is desirable, in actual practice, to form the spacers 13 of stainless steel and to line those portions of the opposing walls of the castings 11 between the spacers with stainless steel so as to insure a uniform and smooth flow of the film-forming material to the extrusion blades 23 and 25.

To remove any tendency for galvanic action to occur, the dissimilar metal contact, which normally gives rise to a difference in potential, may be eliminated by having the bearing plate 21 made entirely of or surface cladded with a nickel material. In view of the quantity of metallic nickel required, this procedure entails considerable expense and provides far more protection than necessary. An alternative and preferred procedure is to plate only the internal edge surfaces of the bearing plate 21 with nickel, as illustrated at 39 in FIGURE 2, to prevent direct contact of the Monel plate with the film-forming material, or in other words, the electrolyte of the galvanic circuit. While the structure shown in the drawings illustrates the internal edge surfaces of the bearing plate 21 as well as the entire internal nozzle cavity as being clad or plated with a nickel coating, as shown at 39 and 41, it will of course be understood that only the critical internal areas of the Monel plate need be plated to achieve the objects of this invention.

In plating the desired surfaces of the bearing plate alone or along with the entire internal nozzle cavity, the nozzle is preferably immersed in a nickel solution composed of an aqueous acid solution of a nickel salt, a reducing agent such as sodium hypohposphite, and a buffering agent like sodium succinate. Direct application of the nickel solution to the required nozzle areas, however, results in a coating which can be easily scraped from both the Monel and stainless steel base materials. In addition to the lack of permanency, a coating of this type introduces the risk that flakes of nickel may lodge between the nozzle blades and cause film streaks or other blemishes. It has been discovered that pretreating the areas to be cladded with a solution of hydrochloric acid and hydrated ferric chloride satisfactorily prepares the Monel and stainless steel surfaces for completely and tenaciously bonding with the nickel coating subsequently applied. An etching solution of this type consisting of 10 grams of ferric chloride and 30 ccs. of hydrochloric acid to make a 120 cc. of solution has been found to be satisfactory for use in this pretreating procedure.

To effect actual cladding of the desired internal surfaces of the Monel plate and the nozzle cavity itself, the nozzle center feed inlet is first blocked or plugged after which the nozzle is immersed upside down into the etching solution which is heated to a temperature of about 50–70° C. If the nozzle blades are attached to the nozzle, they are projected above the surface of the etching solution during this pretreating. The parts are maintained immersed within the etching solution for a period of from 5 to 10 minutes to effect a complete removal of any previous nickel coatings or other foreign matter. The period of immersion can, of course, be varied and will depend to a great degree on the temperature to which the etching solution is heated. After this etching process, the nozzle is removed, cleaned, retreated with etching solution as described above and then, without washing, is immersed or filled with the nickel solution heretofore described. This nickel solution is preferably heated to about 80–90° C. and the parts are maintained immersed therein for approximately one hour. This immersion or coating period may also be varied in accordance with the temperature of the nickel solution. As an indication of the extent of the plating, the nozzle parts may be heated while in contact with the etching solution, whereupon the unplated areas become darkened while the nickel plated portions retain their bright luster.

The etching solution discussed above acts as a catalyst without which the nickel from the plating solution would not deposit on either the Monel or stainless steel base materials. Other catalysts such as cast iron or metallic aluminum will not work as well or as fast. Thus, in addition to providing a tenacious bond between the nickel plating and the base materials, the etching solution here disclosed satisfactorily prepares the surfaces of the base materials for plating by removing any previous nickel coatings and other foreign matter, effects a faster deposition of cladding material without the use of any special catalyst, and serves also as a means by which a visual indication of the coated areas can be obtained.

To test the effectiveness of the nickel coating on the Monel bearing plate, nozzles coated in accordance with the present invention have been utilized in the film forming process and compared with uncoated nozzles and nozzles having only the internal cavity coated with nickel. The results of these spinning runs are as follows:

| Condition of Nozzle Interior | Nozzle No. | Total Run Days | Remarks |
|---|---|---|---|
| Entire Internal Surface Untreated. | 1 | 8 | Lips Badly Corroded. |
| | 2 | 78 | Chain Bubbles Noted After 10 Days. |
| Only Internal Cavity Coated. | 3 | 30 | Chain Bubbles Noted After 13 Days. |
| | 4 | 60 | Chain Bubbles Noted After 27 Days. |
| Entire Internal Surface Coated. | 5 | 77 | Still in Operation Without Any Chain Bubble Formation. |
| | 6 | 88 | Still in Operation Without Any Chain Bubble Formation. |

In comparing the data set forth above, it will be noted that the nozzles of the present invention have run approximately 10 times longer than conventional uncoated nozzles and from 3 to 6 times longer than nozzles in which the internal cavities only have been coated, without developing any chain bubble formations. These actual test figures thus provide clear evidence that the nozzles of the present invention provide a significant increase in the period of trouble-free spinning runs. Since the improved spinning process here described can be directly attributed to the plating of the internal edge portions of Monel bearing plate, it will, of course, be understood that film extrusion nozzles of different structure than that illustrated may be plated in accordance with the present teachings without departing from the spirit and scope of the present invention. Thus, nozzles with no stainless steel lining or with flow directing channels may be plated to provide equally satisfactory results, providing the critical internal edge surfaces of the Monel bearing plate are nickel coated to prevent contact of the same with the film-forming viscose.

It is seen from the above description that the objects of the invention are well fulfilled by the apparatus described. The description is intended to be illustrative only and it is to be understood that changes and variations may be made without departing from the spirit and scope of the invention as defined by the appended claims.

I claim:

1. An extrusion device through which a film forming material having electrolytic characteristics is passed including a metallic main body, a pair of blades carried by said body and together cooperating to provide an extrusion orifice, a bearing plate interposed between said body and blades, and at least a coating on the exposed internal surfaces of said bearing plate, said coating contacting with and being formed of a metal substantially the same as that of said blades.

2. A device as defined in claim 1 wherein said main body has an internal cavity lined with stainless steel which is plated with a metal substantially the same as that of said blades.

3. A device as defined in claim 1 wherein said bearing plate is formed of Monel.

4. An extrusion device through which a film forming material having electrolytic characteristics is passed including a main body, a pair of nickel blades carried by said body and together cooperating to provide an extrusion orifice, and a nickel bearing plate interposed between and engaging with said main body and blades.

5. A device for forming regenerated cellulose films by extruding viscose through the orifice of a nozzle into a coagulating bath including a nozzle body, a pair of nickel blades forming the extrusion orifice, a Monel bearing plate interposed between said main body and blades, and a nickel coating on the internal surfaces of said bearing plate and in engagement with said blades.

References Cited in the file of this patent

UNITED STATES PATENTS

| | | |
|---|---|---|
| 1,999,072 | Allen | Apr. 23, 1935 |
| 2,056,982 | Petrescu | Oct. 13, 1936 |
| 2,067,839 | Godfrey | Jan. 12, 1937 |
| 2,077,836 | Herndon | Apr. 20, 1937 |
| 2,082,618 | Coleman | June 1, 1937 |
| 2,283,169 | Atwood | May 19, 1942 |
| 2,391,050 | Horn | Dec. 18, 1945 |
| 2,643,199 | Hersch | June 23, 1953 |
| 2,772,183 | Talmey et al. | Nov. 27, 1956 |

FOREIGN PATENTS

| | | |
|---|---|---|
| 127,155 | Great Britain | May 29, 1919 |